United States Patent [19]

Sato

[11] Patent Number: 5,139,212

[45] Date of Patent: * Aug. 18, 1992

[54] FISHING REEL

[75] Inventor: Jun Sato, Sakai, Japan

[73] Assignee: Shimano Corporation, Osaka, Japan

[*] Notice: The portion of the term of this patent subsequent to Oct. 23, 2007 has been disclaimed.

[21] Appl. No.: 512,203

[22] Filed: Apr. 20, 1990

Related U.S. Application Data

[60] Division of Ser. No. 782,177, Oct. 1, 1985, Pat. No. 4,964,590, which is a continuation of Ser. No. 636,069, Jul. 30, 1984, abandoned, which is a continuation of Ser. No. 440,426, Nov. 9, 1982, abandoned.

[30] Foreign Application Priority Data

Nov. 11, 1981 [JP] Japan .................. 56-168739
Nov. 11, 1981 [JP] Japan .................. 56-168740
Oct. 13, 1982 [JP] Japan .................. 57-155549

[51] Int. Cl.$^5$ ......................... A01K 89/033
[52] U.S. Cl. ....................... 242/261; 242/292
[58] Field of Search ............. 242/257, 259, 160, 261, 242/292, 293, 294

[56] References Cited

U.S. PATENT DOCUMENTS

| 625,166 | 5/1899 | Hastings | 242/263 |
| 842,551 | 1/1907 | Hunter | 242/256 |
| 1,172,422 | 2/1916 | Benjamin | 242/253 |
| 2,002,424 | 5/1935 | Weaver | 242/253 |
| 3,246,859 | 4/1966 | Martin | 242/250 |
| 3,796,395 | 3/1974 | Rankin, Jr. | 242/268 |
| 4,168,812 | 9/1979 | Karlsson | 242/261 |
| 4,281,808 | 9/1981 | Noda | 242/261 |

FOREIGN PATENT DOCUMENTS 31-2584 2/1956 Japan .
55-110079 8/1980 Japan .
56-5129 2/1981 Japan .

Primary Examiner—John M. Jillions
Attorney, Agent, or Firm—Dickstein, Shapiro & Morin

[57] ABSTRACT

A fishing reel provided with a spool, a drive mechanism for driving the spool, a clutch mechanism for allowing the spool to freely rotate with respect to the drive mechanism, and a clutch operating mechanism, so that an angler, when pushing an operating portion of a clutch lever provided at the clutch operating mechanism to disconnect the clutch mechanism, may put the tip of his finger operating the operating portion in close proximity to the outermost layer of a fishing line wound onto the spool, thereby making it possible to stop free rotation of the spool, by use of the aforesaid finger, in continuation of its pushing the operating portion.

6 Claims, 3 Drawing Sheets

FISHING REEL

This application is a divisional of application of Ser. No. 06/782,177, filed Oct. 1, 1985, now U.S. Pat. No. 4,964,590 which is a continuation application of Ser. No. 06/636,069, filed Jul. 30, 1984, now abandoned and which is a continuation application of Ser. No. 06/440,426, filed Nov. 9, 1982, now abandoned.

FIELD OF THE INVENTION

This invention relates to a fishing reel, and more particularly to a fishing reel which has a spool journalled to a pair of side frames at the reel body, the spool being driven by a drive mechanism and being freely rotatable with respect thereto by a clutch mechanism which is operated by a clutch operating mechanism.

BACKGROUND OF THE INVENTION

Generally, the type of fishing reel described above has been well-known as a double bearing reel, in which the clutch mechanism is provided with a clutch lever supported slidably to the reel body. The clutch lever has at its utmost end an operating portion projecting from the outer surface of the reel body so that the operating portion may be manipulated to disconnect the clutch mechanism to make the spool freely rotatable for casting.

An angler, when intending to perform casting, at first pushes the operating portion by his finger and press-contacts the finger onto the outermost layer of a fishing line wound on the spool to stop its rotation, and then swings a fishing rod for casting.

The reason for the above is that the spool, unless its rotation is stopped, will continue its free rotation due to the weight of a rig attached to a line so that the fishing rig which is intentionally kept at the tip of the rod falls on the ground before the rig reaches a desired position.

The conventional double-bearing reel, however, has the operating portion of the clutch lever positioned apart from the spool so that the angler, when intending to stop the spool by use of his finger after pushing the operating portion, cannot do so immediately, and a time difference occurs from the pushing of the operating portion and the stopping of the spool. As a result, he cannot attain a desired casting because the fishing rig falls from a desire location.

SUMMARY OF THE INVENTION

In the light of the above problem, this invention has been designed. An object of the invention is to provide a fishing reel which enables an angler to stop the free rotation of the spool almost simultaneously with the pushing of the operating portion at the clutch lever.

This invention is directed at keeping the angler's finger for pushing the operating portion in close proximity to the outermost layer of the fishing line wound on the spool when he intends to push the operating portion which is exposed from the outer surface of the reel body, and disconnect the clutch mechanism.

Therefore, he can use his finger to stop the rotation of the spool almost simultaneously with pushing the operating portion, thereby keeping the fishing rig always in the most suitable position for a desired casting.

A preferable means for keeping the angler's finger in close proximity to the outermost layer of the fishing line is to provide an extension at the operating portion extending toward the spool. Another preferable means is to provide the extension extending inwardly from one axial end surface of the spool. Still another preferable means is to provide the extension extending slantwise radially inwardly of the spool so that the angler can move his finger slidably to contact with the outermost layer of the fishing line wound onto the spool. The outermost layer of the wound fishing line serves as the criterion for setting the operating portion and also includes the outer periphery of each flange of the spool.

These and other objects of the invention will be seen by reference to the description, taken in connection with the accompanying drawings.

DETAILED DESCRIPTION OF THE INVENTION

Figure 1:
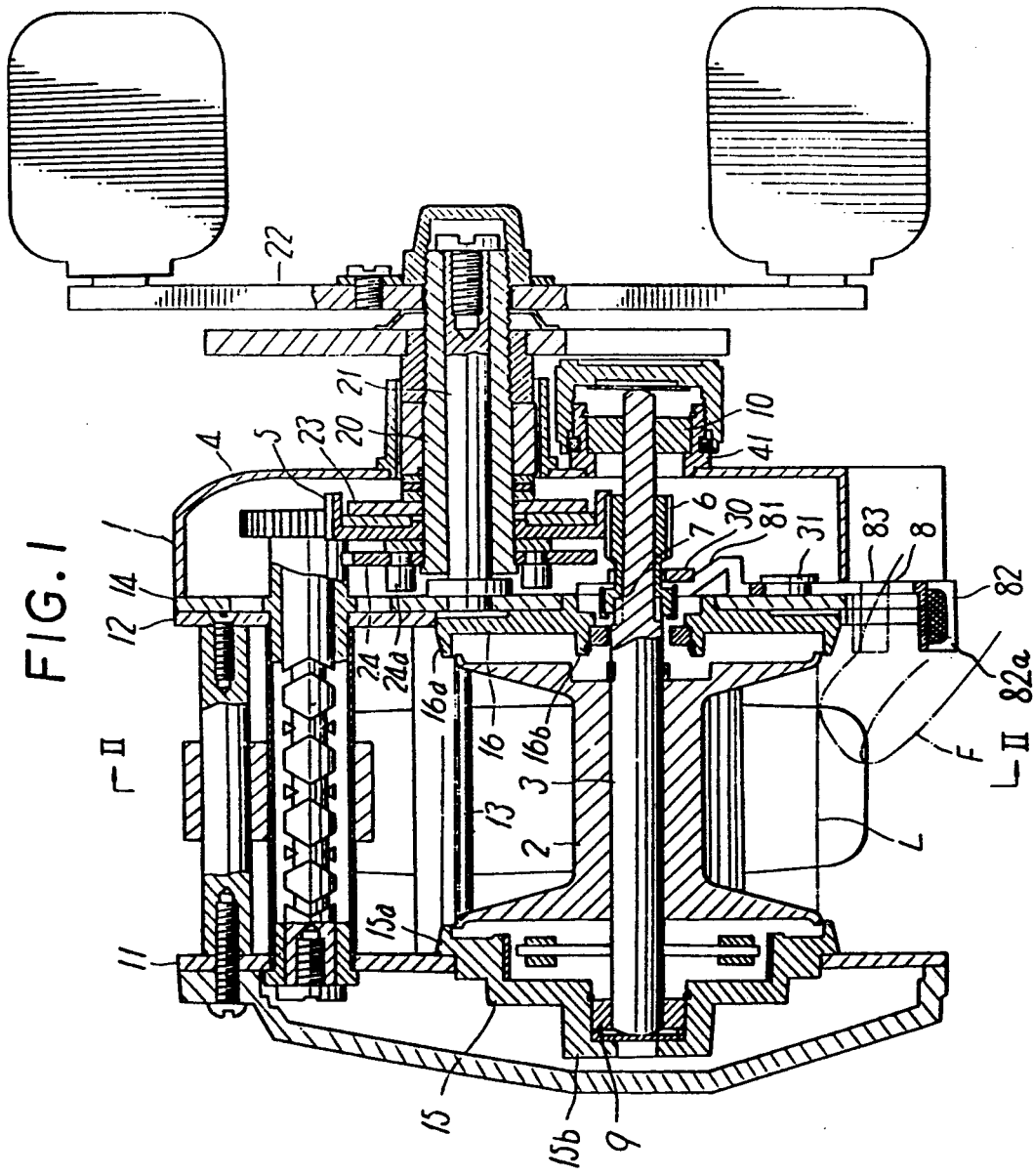
FIG. 1 is a sectional plan view of an embodiment of a fishing reel of the invention.
Figure 2:
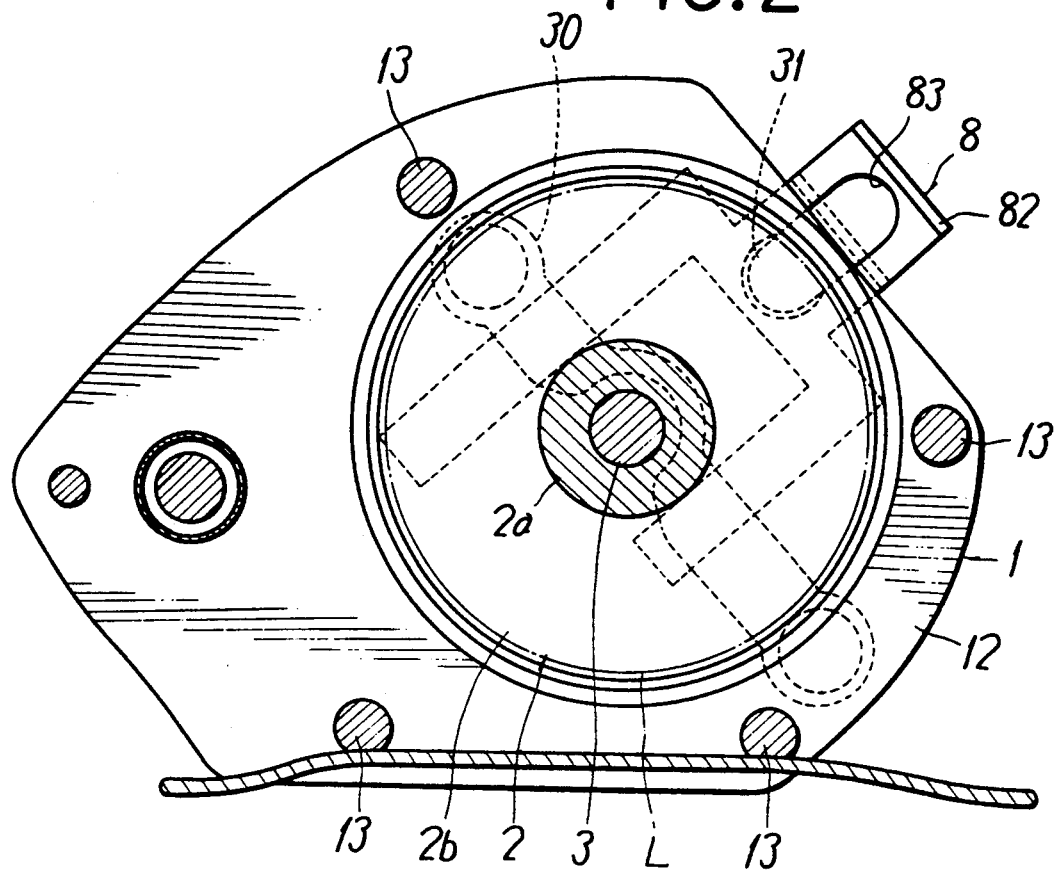
FIG. 2 is a sectional view taken on the line II—II in FIG. 1.

Referring to FIGS. 1 and 2, a fishing reel is shown which has a spool shaft 3 having a spool 2 and journalled to a reel body 1. Reel body 1 comprises a left-hand side-plate 11, a right-hand side-plate 12 having a doubling plate 14, and a plurality of connecting rods 13. A handle shaft 20 having a master gear 5 is supported rotatably through a support shaft 21, between the right-hand side plate 12 and a cup-shaped cover 4 at the outside thereof, and projects at one axial end from the cover 4 so that a handle 22 is fixed to the extension of handle shaft 20. The spool shaft 3 extends at one axial end to enter between the sideplate 12 and the cover 4, and carries a pinion 6 engageable with the master gear 5, on the extension of spool shaft 3 in relation of being rotatable and axially slidable. Between the pinion 6 and the main portion of spool shaft 3 is provided a clutch mechanism 7, which engages or disengages by a clutch lever 8 so that a rotary force is transmitted from the handle 22, and in turn the handle shaft 20, to the spool shaft 3 through the pinion 6 and clutch mechanism 7 to thereby rotate the spool 2 for winding the line thereon, or the clutch lever 8 is operated to disengage the clutch mechanism 7 to thereby allow the spool 2 to freely rotate.

Bearing housings 15, 16 and 41 are fabricated at the centers of the side-plates 11 and 12 and cover 4 respectively, their bearing housings 15 and 16 being provided at the outer peripheries with cylindrical portions 15a and 16a each of an inner diameter slightly larger than an outer diameter of each flange of the spool 2 and at the central portions with smaller diameter cylindrical bearing portions 15b and 16b respectively, the housings 15, and 41 encasing therein bearings 9 and 10 respectively. Housing 16 encases a deflection bearing 16'.

Onto the extension of handle shaft 20 entering into the cover 4 is freely rotatably fitted the master gear 5 and is not-rotatably fitted an anti-reverse-rotation plate 24 having a friction plate 23 and a plurality of projections 24a, so that the rotary force is transmitted from the handle shaft 20 to the master gear 5 through the friction plate 23.

The clutch mechanism 7 comprises flat faces provided at an intermediate portion of spool shaft 3 and a cylindrical portion of a not-round inner surface provided at the pinion 6 and engageable with the flat faces, the cylindrical portion at the pinion 6 disengaging from the flat faces at the spool shaft 3 by means of operation of the clutch lever 8, thereby allowing the spool shaft 3 and the spool 2 to freely rotate.

A clutch operating mechanism comprises the clutch lever 8 and a clutch yoke 30 holding the pinion 6 to always bias the clutch mechanism 7 in the direction of its engagement, the clutch lever 8 being bifurcate at one end and having a biasing portion 81 to bias the clutch yoke 30 and at the other end an operating portion 82. The clutch lever 8 also is supported to the doubling plate 14 movably in reciprocation through a pin 31 fixed perpendicularly to the spool shaft 3 and an elongate slot 83 formed at the lever 8, and biased in the direction of the forward movement by a return spring (not shown) so that the operating portion 82 is pushed to axially move the clutch yoke 30, thereby moving the pinion 6 to disengage the clutch mechanism 7.

The handle 22 is rotated to allow the projection 24a at the anti-reverse-rotation plate 24 to hit a contact (not shown) at the utmost end of clutch lever 8 to thereby return the clutch lever 8 by the aid of the return spring and axially move the pinion 6 by the biasing force of clutch yoke 30, thus engaging the clutch mechanism 7. In addition, the clutch lever 8 is swingable around the pin 31 at the doubling plate 14 and has at the utmost end an engaging portion which engages with a cutout stepped portion provided at the doubling plate 14, thereby holding the clutch lever 8 at the position where the forward movement thereof is terminated.

Furthermore, a drive mechanism for the spool 2 comprises the handle shaft 20, handle 22, master gear 5 and friction plate 23.

In the fishing reel constructed as described above, this invention is constructed so that the operating portion 82 at the clutch lever 8 is exposed from the outer surface of the cover 4 at the reel body 1 so that a finger F, mainly the thumb, of the angler, after pushing the operating portion 82, is positioned at the tip in close proximity to the outermost layer of the line wound onto the spool 2 or the outer periphery of flange 2b at the spool 2 as shown by the dot-and-dash line in FIG. 1.

Referring to FIGS. 1 and 2, a part of the outer peripheral edge of the respective side-plate 12, doubling plate 14 and cover 4, in the vicinity of the lever 8 approaches the outer periphery of the larger diameter cylindrical portion 16a, and the operating portion 82 at the lever 8 is provided at the utmost end with an extension 82a extending toward the trunk 2a of spool 2 so that the thumb F of the angler for pushing the operating portion 82 is positioned at the tip in proximity to the outermost layer L of the line wound onto the spool 2 and the extension 82a is positioned at the utmost end near the utmost end of flange 2b at the spool 2. Alternatively, the utmost end of operating portion 82 may be positioned radially of the spool 2 in the vicinity of the outer periphery of flange 2b as well as the outermost layer L of the line.

When an angler intends to cast the line by use of the fishing rod having a reel constructed as described above, at first he rotates the handle 22 to wind up the line onto the spool 2 so that the fishing rig at the end of the line is kept in the vicinity of the tip of the fishing rod. He, then pushes the operating portion 82 to disconnect the clutch mechanism 7 and inhibits by his thumb F the free rotation of the spool 2, and thereafter swings the rod to cast the fishing rig. In this case, the operating portion 82, after being pushed to disconnect the clutch mechanism 7, becomes positioned at the termination of the forward movement of the lever 8 and in proximity to the outermost layer of the line wound onto the spool 2 so that the tip of the angler's thumb F will approach the outermost layer of the line to contact therewith, or about to do so, whereby the free rotation of spool 2 can be restrained almost simultaneously with and in continuation of pushing the operating portion 82.

As a result, the free rotation of spool 2 can be inhibited almost simultaneously with the disconnection of clutch mechanism 7 to restrict to a minimum a fall of the fishing rig due to its weight, resulting in a desired casting.

In addition, the operating portion 82 in the above embodiment is not limited particularly to a position radially outward of the spool 2.

The operating portion 82, which is parallel at the outer surface to the axis of the spool 2 and in turn the spool shaft 3, may alternatively be slanted at the utmost end radially inwardly of the spool 2. In such case, the angler can shift his thumb F, after pushing the operating portion 82, to quickly stop the free rotation of spool 2.

Figure 3:
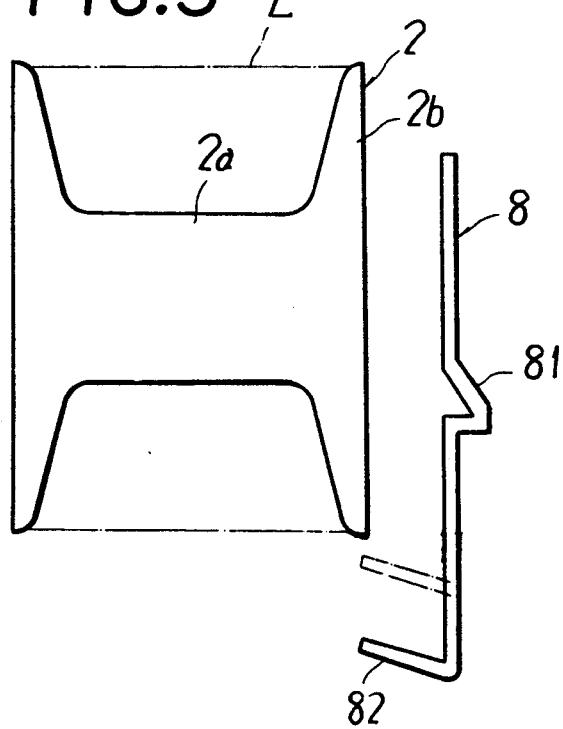
FIG. 3 is a schematic view explanatory of a modified embodiment of the invention.

Also, the operating portion 82, which extends toward the spool 2 as shown in FIGS. 1 through 3, may, especially in a small-sized reel, extend toward the handle 22, which will achieve the same effect as the above.

Figure 4:
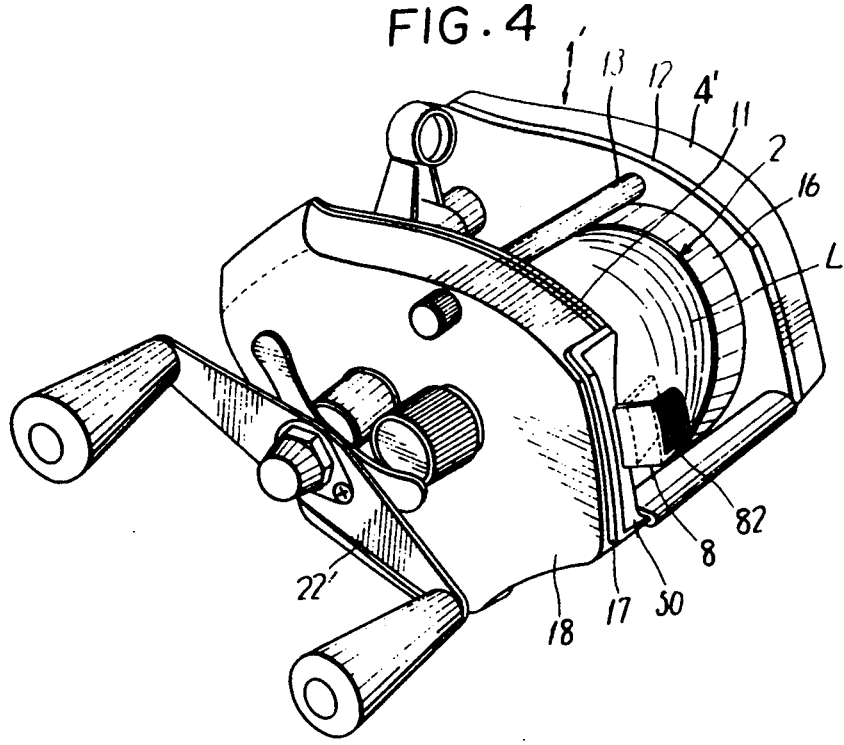
FIG. 4 is a perspective view of another embodiment of the invention.

Alternatively, a left-hand handle type reel, as shown in FIG. 4, may be so constructed that a left-hand side-plate 11 is attached with a doubling plate 17 and a cup-shaped cover 18, which form a gear case, the cover 18 projecting at the outer edge axially outwardly with respect to the aforesaid bearing housing 15, and the side-plate 11 and doubling plate 17 each are bent at the outer periphery in an approximately L-like shape to provide a recess 50 at the position where the lever 8 is supported, thereby allowing the outer edge of the recess 50 to approach the outer periphery of the bearing housing 15. The construction shown in FIG. 4 is also applicable to the right-hand handle type reel shown in FIGS. 1 and 2. Elements denoted by a prime (') in FIG. 4 have counterparts in FIG. 1, but are of slightly different configuration.

Figure 5:
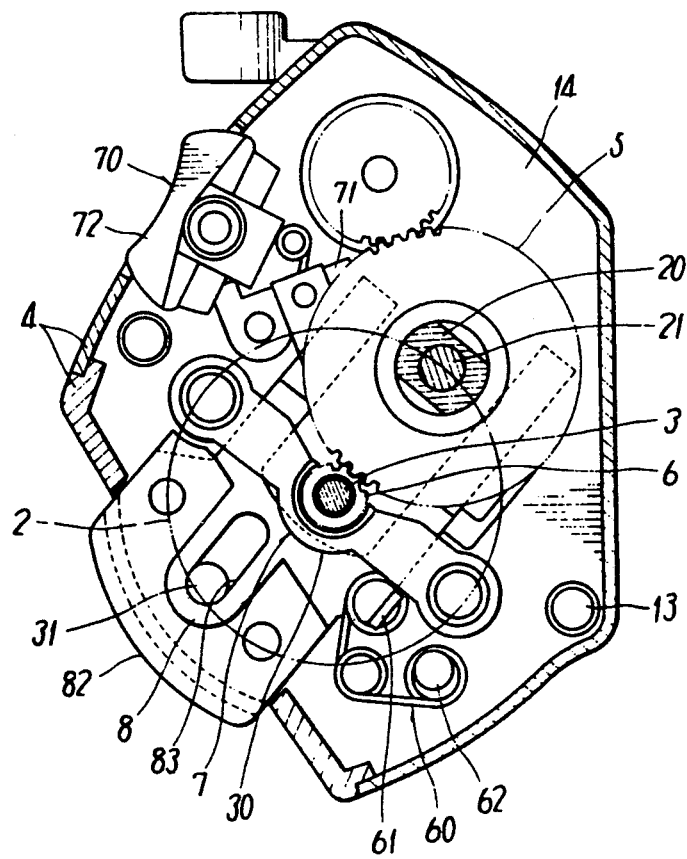
FIG. 5 is a sectional view of still another embodiment of the invention.

Furthermore, the clutch lever 8, which is biased in the direction of backward movement by the return spring, should be provided with a retaining means which retains the clutch lever 8 at the termination of forward movement against the return spring. When the clutch lever 8 is retained a slight backlash is created in the direction of backward movement to cause the operating portion 82 to move slightly away from the spool. Hence, it is preferable to use a torsion spring 60, instead of the unidirectionally biasing coil spring, for the return spring as shown in FIG. 5, so that the clutch lever 8 is biased by the torsion spring 60 to be capable of being changed-over between the termination of forward and backward movements. In this case, the operating portion 82 is biased toward the spool 2 at the position where the clutch lever 8 terminates its forward movement, thereby being positioned in further close proximity to the spool 2.

In addition, in FIG. 5, reference numeral 61 designates a support at the clutch lever 8 for supporting one end of torsion spring 60, 62 designates a support at the doubling plate 14 for supporting the other end of the same, and 70 designates an anti-reverse-rotation mechanism having a pawl 71 in mesh with the anti-reverse-rotation plate 24 in FIG. 1, the pawl 71 being controlled to be on or off by use of an operating knob 72.

As seen from the above, the fishing reel of the invention is provided with a clutch operating portion projecting toward the spool to permit the free rotation of the spool to be quickly stopped by use of the angler's finger operating the clutch lever, in continuation of the disconnecting of the clutch mechanism.

Hence, the angler can keep the fishing rig in the most suitable position for casting to always perform his desired casting.

Although several embodiments have been described, they are merely exemplary of the invention and not to be constructed as limiting, the invention being defined solely by the appended claims.

What is claimed is:

1. A fishing reel comprising a reel body having first and second side frames, a spool having a trunk and end flanges connected at opposite ends of said trunk and disposed between said side frames for winding up fishing line, each of said side frames having a respective associated portion which surrounds at least a portion of a respective end flange, a drive mechanism for driving said spool, a clutch mechanism for selectively allowing said spool to either be drivingly coupled to said drive mechanism or to freely rotate with respect to said drive mechanism, and a clutch operating mechanism for operating said clutch mechanism, said clutch operating mechanism having a clutch lever located at and extending outwardly from said first side frame in a direction radially of said spool and an operation portion connected to an end of said clutch lever, said operating portion being movable to a first position where said clutch mechanism is operated to drivingly engage said spool and drive mechanism and to a second position closer to an axis of said spool where the clutch mechanism interrupts a driving engagement between said spool and drive mechanism to allow free rotation of said spool with respect to said drive mechanism, said operation portion having a base portion attached to said clutch lever and an extension extending from said base portion and clutch lever at least partially in an axial direction of said spool toward said second side frame, said extension having an undersurface which is radially spaced from and opposes the surrounding portion associated with said first side frame, said extension having an utmost end positioned radially outwardly with respect to a spool flange located adjacent said first side frame, said utmost end terminating such that it does not substantially intercept any plane which cuts through and is perpendicular to said trunk, said extension, when said operating portion moves to said second position, moving toward the axis of said spool with said utmost end terminating at a location adjacent a periphery of said first flange, and in close proximity to an outermost layer of fishing line wound onto said spool, so that when said operating portion is pushed by an angler's finger toward said second position where said pushing operation is terminated, said finger approaches said spool making it possible to stop by said finger the free rotation of said spool, in continuation of the pushing of said operation portion to said second position.

2. A fishing reel according to claim 1, wherein said extension of said operating portion of said clutch lever is slanted so as to shift the utmost end of said extension radially inwardly of said spool.

3. A fishing reel according to claim 1, wherein said clutch operating mechanism moves forwardly and backwardly and is provided with a torsion spring which biases said clutch lever so that it can be moved between a position where said clutch lever terminates its forward movement and a position where said clutch lever terminates it backward movement.

4. A fishing reel according to claim 1, wherein said surrounding portion of said first side frame projects towards said other side frame and the utmost end of said operating portion is located radially outwardly of said projecting surrounding portion.

5. A fishing reel according to claim 1, wherein the utmost end of said operating portion is located adjacent a periphery of the surrounding portion associated with said first side frame when said operating portion moves to said second position.

6. A fishing reel comprising a reel body having a pair of side frames, a spool having a trunk and end flanges connected at opposite ends of said trunk and disposed between said side frames for winding up a fishing line, a drive mechanism for driving said spool, a clutch mechanism for selectively allowing said spool to either be drivingly coupled to said drive mechanism or to freely rotate with respect to said drive mechanism, and a clutch operating mechanism for operating said clutch mechanism, said clutch operating mechanism having a clutch lever located at one of said side frames of said spool and an operation portion located at said one side frame and connected to an end of said clutch lever, which is movable to a first position where said clutch mechanism is operated to drivingly engage said spool and drive mechanism and to a second position where said clutch mechanism is operated to allow free rotation of said spool with respect to said drive mechanism, said operation portion being exposed to the outer surface of said reel body and having an extension extending from said clutch lever at least partially in an axial direction of said spool toward the other side frame, said extension having an utmost end which is positioned radially outwardly with respect to a first spool flange located at the side frame at which said clutch lever is located, said utmost end terminating such that it does not substantially intercept any plane which cuts through and is perpendicular to said trunk, said extension, when said operating portion moves to said second position, moving toward the axis of said spool so that when said operating portion is pushed by an angler's finger toward said second position where said pushing operation is terminated, said finger approaches said spool making it possible to stop by said finger the free rotation of said spool, in continuation of the pushing of said operation portion to said second position and wherein said one side frame has a recess therein and said clutch lever is mounted to extend outwardly from said one side frame through a bottom face of said recess.

* * * * *